United States Patent
Suzuki

(10) Patent No.: US 6,939,400 B2
(45) Date of Patent: Sep. 6, 2005

(54) INK, PRODUCTION METHOD OF THE SAME MATERIALS FOR PRODUCING THE SAME AND PRINTED MATTER WITH THE SAME

(75) Inventor: Yuuji Suzuki, Tokyo (JP)

(73) Assignee: Teikoku Printing Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/723,265

(22) Filed: Nov. 25, 2003

(65) Prior Publication Data

US 2004/0103816 A1 Jun. 3, 2004

(30) Foreign Application Priority Data

Nov. 28, 2002 (JP) ........................................ 2002-345247

(51) Int. Cl.[7] ............................................... C09D 11/00
(52) U.S. Cl. .................. 106/31.6; 106/31.86; 106/31.65
(58) Field of Search ............................ 106/31.6, 31.86, 106/31.65

(56) References Cited

U.S. PATENT DOCUMENTS 5,037,475 A * 8/1991 Chida et al. ................. 106/403
5,176,746 A * 1/1993 Nakanishi et al. ........ 106/31.36

FOREIGN PATENT DOCUMENTS

JP 2784566 B 5/1998
JP 3151606 B 1/2001

* cited by examiner

*Primary Examiner*—J. A. Lorengo
*Assistant Examiner*—Veronica F. Faison
(74) *Attorney, Agent, or Firm*—Jordan and Hamburg LLP

(57) ABSTRACT

An ink comprises 100 parts by weight of an aluminum flake containing aluminum flakes of 0.5 $\mu$m or less, more preferably 0.3 $\mu$m or less, in thickness and 20 $\mu m^2$ to 2,000 $\mu m^2$ in flake area in a content of 75% or more, 3 to 200 parts by weight of a binding agent, and 600 to 4,000 parts by weight of a solvent, wherein the solvent is the one containing 20 wt % or more of 3-methyl-3-methoxy-1-butanol (MMB).

14 Claims, No Drawings

INK, PRODUCTION METHOD OF THE SAME MATERIALS FOR PRODUCING THE SAME AND PRINTED MATTER WITH THE SAME

BACKGROUND OF THE INVENTION

1. Field of the Invention

The present invention relates to an ink, a production method of the ink, the materials for producing the ink and the printed matter wherein printing is made by use of the ink.

2. Description of the Related Art

It has so far been well known that aluminum flake is added to an ink to prepare a metallic tone ink. However, a printed matter printed with such a metallic tone ink has minute glittering dots, but does not exhibit any specular gloss.

Thereafter, the use of an ink, in which a special aluminum powder is utilized and the amounts of a binding agent and a diluting solvent are specified, has lead to the advent of a technique with which a bright printed matter with metallic luster can be obtained (see Patent Document 1). However, in practice, it has been found that no printed matter high in specular gloss can be obtained even when printing is made with the ink described in Patent Document 1.

In these circumstances, an ink has been proposed which comprises 100 parts by weight of an aluminum flake containing aluminum flakes of 0.5 $\mu$m or less in thickness and 20 $\mu m^2$ to 2,000 $\mu m^2$ in flake area in a content of 75% or more, 15 to 200 parts by weight of a binder polymer, and 600 to 3,000 parts by weight of a solvent (Patent Document 2). It is true that following the description of Patent Document 2, a printed matter higher in specular gloss than a printed matter described in Patent Document 1 can be obtained.

However, the types of solvents, utilized in an ink which imparts to a printed matter metallic luster or specular gloss, are at best described in paragraph [0012] in Patent Document 2 as such that "Additionally, the solvent utilized is the one that dissolves the above described binder polymer and dilutes the solution thus obtained, and the general examples of such a solvent include esters, ethers, ketones, aromatic hydrocarbons and the like." Additionally, even in the examples concerned, ketone based solvents and glycol ether based solvents are merely exemplified, but the compound names of such solvents are not specified.

Additionally, in Patent Document 1, particularly in paragraph [0024], there is found a description that "Furthermore, as the diluting solvent utilized in the present invention, any solvent capable of dissolving and diluting a binding agent used can be optionally utilized, and hence the solvent can be selected according to the printing method involved in such a way that the solvent is optionally selected from the commonly used solvents including alcohols such as methyl alcohol, ethyl alcohol, propyl alcohol, and butyl alcohol; ktones such as acetone, isophorone, methyl ethyl ketone, and methyl isobutyl ketone; cellosolves such as methyl cellosolve and ethyl cellosolve; and aromatic hydrocarbons such as toluene and xylene; additionally, aliphatic hydrocarbons, ethers and the like, commonly used as diluents and compatible with the above described solvents but incapable of dissolving the binding agents, can also be used as printing aids and dryness regulators." Furthermore, in paragraph [0039] in Patent Document 1, although the standard for solvent selection is not presented, there is found a description that "Incidentally, the adaptabilities of the bright ink 2 with respect to various types of substrates have been examined, and the results obtained are as shown in Table 5," and there is found another description in Table 5 that isopropyl alcohol and cellosolves are adaptable to various resins such as polyvinyl chloride, PET (polyester), acrylic resin, and polycarbonate. However, no description is found as to how isopropyl alcohol and cellosolves adapt.

[Patent Document 1]
 Japanese Patent No. 2784566
[Patent Document 2]
 Japanese patent No. 3151606

When printing is made according to Patent Document 1 and Patent Document 2, a bright printed matter or a specular surface printed matter can be obtained, but it has been found that serious drawbacks are generated when such printing is applied to industrial mass production, particularly, when the screen printing is applied to mass printing.

As a first drawback, the inks described in Patent Document 1 and Patent Document 2 each contains a large content of solvent, and hence mass printing is not preferable because the working environment is remarkably degraded in operation with ordinary facilities when a highly toxic solvent is used for which the LD 50 value representing the mouse oral toxicity is 2,000 mg/kg or less, particularly, 1,600 mg/kg or less, or a solvent is used for which the vapor pressure is high (drawback <1>). As a second drawback, in making mass printing, the specular gloss appearance is degraded and printing unevenness is generated with increasing number of the printed sheets when the number of the printed sheets is large (drawback <2>). As a third drawback, when printing is made on the backside of a transparent polycarbonate substrate and viewing is made from the front surface side of the substrate, the specular gloss appearance is sometimes remarkably degraded (drawback <3>).

Accordingly, an object of the present invention is the provision of an ink to meet the purpose of concurrently resolving the above described drawback <1>, drawback <2>, and drawback <3>, a production method of the ink, the materials for producing the ink, and the printed matter wherein printing is made by use of the ink.

SUMMARY OF THE INVENTION

For the purpose of resolving the above described problems, the present invention provides an ink comprising 100 parts by weight of an aluminum flake containing aluminum flakes of 0.5 $\mu$m or less, more preferably 0.3 $\mu$m or less, in thickness and 20 $\mu m^2$ to 2,000 $\mu m^2$ in flake area in a content of 75% or more, 3 to 200 parts by weight of a binding agent, and 600 to 4,000 parts by weight of a solvent, wherein the solvent is the one containing 20 wt % or more of 3-methyl-3-methoxy-1-butanol. Additionally, when the above described solvent is the one containing 40 wt % or more of 3-methyl-3-methoxy-1-butanol, the problems in the present invention can be resolved further more satisfactorily.

DETAILED DESCRIPTION OF THE PREFERRED EMBODIMENTS

In the present invention, 3-methyl-3-methoxy-1-butanol contained in the solvent is represented by the following formula, has an LD 50 value of 5,830 mg/kg representing the mouse oral toxicity thereof the toxicity thereof is extremely low, and is not so large in vapor pressure at room temperature.

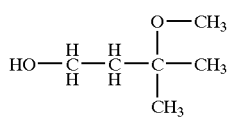

Accordingly, when the screen printing is applied to conduct mass printing which an ink comprising a solvent containing 20 wt % or more of 3-methyl-3-methoxy-1-butanol which is thus low in toxicity, the working environment is remarkably improved with ordinary facilities (resolution of drawback <1>).

Additionally, 3-methyl-3-methoxy-1-butanol has an appropriate boiling point of 174° C., and hence even when the screen printing is applied to conduct mass printing by use of the above described ink, clogging is scarcely caused in the screen by the solvent evaporation on the stencil with the elapsed time of printing operation. Accordingly, when the screen printing is applied to mass printing, even for a large number of printed sheets, neither the gradual generation of printing unevenness nor the gradual degradation of the specular gloss appearance caused by the printing unevenness occurs (resolution of drawback <2>).

Additionally, 3-methyl-3-methoxy-1-butanol dissolves satisfactorily a binding agent for use in ink such as polyester resin, acrylic resin, cellulose derivative resin, polyvinyl butyral resin and the like, but is small on one hand in affinity to polycarbonate and the boiling point thereof is appropriate, and hence even when this compound is applied onto a polycarbonate substrate, drying can be conducted without damaging the surface of the polycarbonate substrate. It is particularly preferable that the drying temperature of the printed matter is of the order of 40 to 60° C. Accordingly, even when the above described ink is printed on the backside of the transparent polycarbonate substrate, the backside of the polycarbonate substrate is prevented from being damaged and thereby whitened. Thus, no degradation of the specular gloss appearance is found when printing is made on the backside of the transparent polycarbonate substrate and viewing is made from the front surface side of the substrate (resolution of drawback <3>).

Additionally, the present invention provides a production method of an ink comprising a step of mixing a mixture, which comprises an aluminum flake containing aluminum flakes of 0.5 $\mu$m or less, preferably 0.3 $\mu$m or less, in thickness and 20 $\mu m^2$ to 2,000 $\mu m^2$ in flake area in a content of 75% or more and a solvent containing 20 wt % or more of 3-methyl-3-methoxy-1-butanol, with either a binding agent or a binding agent solution. According to a process involving such a step, the above described ink capable of resolving the drawbacks <1> to <3> can be easily produced by very simple operation.

Additionally, the present invention provides a mixture which comprises an aluminum flake containing aluminum flakes of 0.5 $\mu$m or less, preferably 0.3 $\mu$m or less, in thickness and 20 $\mu m^2$ to 2,000 $\mu m^2$ in flake area in a content of 75% or more and a solvent containing 20 wt % or more of 3-methyl-3-methoxy-1-butanol. The production of the ink by use of such a mixture permits obtaining the ink capable of resolving the drawbacks <1> to <3> without being accompanied by a dangerous process of handling the above described aluminum flakes alone.

Additionally, the present invention provides a printed matter wherein printing is made on a transparent substrate by use of the above described ink. As the transparent substrate, polyester resin (PET), acrylic resin, polycarbonate resin, glass and the like can be used; but an ink in which the solvent contains 20 wt % or more of 3-methyl-3-methoxy-1-butanol is used for the printed matter, and hence even if the above described substrate is polycarbonate resin, it is suppressed for the backside on which the ink has been printed to be damaged by the solvent. Accordingly, it is preferable to view the printed matter from the surface, as being the front surface, opposite to the printed surface of the transparent substrate for the purpose of imparting the specular gloss appearance.

EXAMPLES

Description will be made below on the Examples of the present invention and Comparative Examples.

Example A

A mixture was prepared which is composed of 100 parts by weight of an aluminum flake containing aluminum flakes of 0.15 $\mu$m in thickness and 20 $\mu m^2$ to 2,000 $m^2$ in flake area in a content of 90% and 900 parts by weight of a solvent containing 3-methyl-3-methoxy-1-butanol (hereinafter referred to as MMB) in 100 wt %.

Example B

A mixture was prepared which is composed of 100 parts by weight of the same aluminum flake as used in Example A and 900 parts by weight of a solvent containing MMB in 40 wt % and propyleneglycol monomethyl ether (hereinafter referred to as PGM) in 60 wt %.

Example C

A mixture similar to that in Example B was prepared except that the solvent composition was such that the content of MMB was 20 wt % and the content of PGM was 80 wt %.

Example D

A mixture similar to that in Example B was prepared except that the solvent composition was such that the content of MMB was 80 wt % and the content of methyl cellosolve (hereinafter referred to as MC) was 20 wt %.

Comparative Example A

A mixture similar to that in Example B was prepared except that the solvent composition was such that the content of MMB was 15 wt % and the content of PGM was 85 wt %.

Comparative Example B

A mixture similar to that in Example A was prepared except that the solvent composition was such that the content of PGM was 100 wt %.

Comparative Example C

A mixture similar to that in Example A was prepared except that the solvent composition was such that the content of MC was 100 wt %.

Reference Example A

A resin solution was prepared which was composed of 100 parts by weight of polyvinyl butyral resin as a binding agent and 900 parts by weight of the solvent used in Example A.

Reference Example B

A resin solution similar to that of Reference Example A was prepared except that the solvent having the composition adopted in Example B was used.

Reference Example C

A resin solution similar to that of Reference Example A was prepared except that the solvent having the composition adopted in Example C was used.

Reference Example D

A resin solution similar to that of Reference Example A was prepared except that the solvent having the composition adopted in Example D was used.

Reference Example E

A resin solution similar to that of Reference Example A was prepared except that the solvent having the composition adopted in Comparative Example A was used.

Reference Example F

A resin solution similar to that of Reference Example A was prepared except that the solvent having the composition adopted in Comparative Example B was used.

Reference Example G

A resin solution similar to that of Reference Example A was prepared except that the solvent having the composition adopted in Comparative Example C was used.

Examples 1 to 4

The mixture of Example A and the resin solution of Reference Example A were mixed together (Example 1), the mixture of Example B and the resin solution of Reference Example B were mixed together (Example 2), the mixture of Example C and the resin solution of Reference Example C were mixed together (Example 3), the mixture of Example D and the resin solution of Reference Example D were mixed together (Example 4), and thus the inks (Examples 1 to 4) shown below in Table 1 were obtained.

TABLE 1

| Example | Aluminum (parts by weight) | Binding agent (parts by weight) | Solvent (parts by weight) | Solvent composition |
|---|---|---|---|---|
| 1 | 100 | 100 | 1800 | MMB = 100% |
| 2 | 100 | 100 | 1800 | MMB = 40% PGM = 60% |
| 3 | 100 | 100 | 1800 | MMB = 20% PGM = 80% |
| 4 | 100 | 100 | 1800 | MMB = 80% MC = 20% |

PGM: Propyleneglycol monomethyl ether
MMB: 3-Methyl-3-methoxy-1-butanol
MC: Methyl cellosolve Screen printing was conducted with the inks of Examples 1 to 4 by use of a T-250 mesh stencil on one side surface of a sheet of 0.2 mm thick transparent polycarbonate film. The printed matters thus obtained were dried at 60° C. for 30 minutes. The number of the sheets of each printed matter was set at 500. The specular gloss appearance of each obtained printed matter was observed visually from the side of the surface opposite to the printed surface. Additionally, the printing conditions and the working environment were also observed, and the results thus obtained are shown below in Table 2.

TABLE 2

| Example | Specular gloss appearance First sheet | Specular gloss appearance 500th sheet | Stencil clogging/printing unevenness First Sheet | Stencil clogging/printing unevenness 500th sheet | Working environment |
|---|---|---|---|---|---|
| 1 | ⊚ | ⊚ | ⊚ | ⊚ | Solvent vapor concentration: low |
| 2 | ⊚ | ⊚ | ⊚ | ⊚ | Solvent vapor concentration: low |
| 3 | ⊚ | ○ | ⊚ | ○ | Solvent vapor concentration: low |
| 4 | ⊚ | ⊚ | ⊚ | ⊚ | Solvent vapor concentration: low |

⊚: Excellent
○: Good
Δ: Poor
X: Very poor

Comparative Examples 1 to 3

The mixture of Comparative Example A and the resin solution of Reference Example E were mixed together (Comparative Example 1), the mixture of Comparative Example B and the resin solution of Reference Example F were mixed together (Comparative Example 2), the mixture of Comparative Example C and the resin solution of Reference Example G were mixed together (Comparative Example 3), and thus the inks (Comparative Examples 1 to 3) shown below in Table 3 were obtained.

TABLE 3

| Comparative example | Aluminum (parts by weight) | Binding agent (parts by weight) | Solvent (parts by weight) | Solvent composition |
|---|---|---|---|---|
| 1 | 100 | 100 | 1800 | PGM = 85% MMB = 15% |
| 2 | 100 | 100 | 1800 | PGM = 100% |
| 3 | 100 | 100 | 1800 | MC = 100% |

Printing was made with the inks of Comparative Examples 1 to 3 under the same conditions as those in Examples 1 to 4, and the observation similar to that in these examples was conducted. The results thus obtained are shown below in Table 4.

TABLE 4

| Comparative example | Specular gloss appearance First sheet | Specular gloss appearance 500th sheet | Stencil clogging/printing unevenness First sheet | Stencil clogging/printing unevenness 500th sheet | Working environment |
|---|---|---|---|---|---|
| 1 | ⊚ | Δ | ⊚ | Δ | Solvent vapor concentration: slightly high |
| 2 | ⊚ | X | ⊚ | X | Solvent vapor concentration: high |
| 3 | ⊚ | X | ⊚ | X | Solvent vapor concentration: high |

According to the present invention, as described above, the working environment is not remarkably deteriorated even with ordinary facilities when mass printing has been made (resolution of drawback <1>), neither the gradual degradation of the specular gloss appearance nor the generation of printing unevenness occurs even for a large number of printed sheets when mass printing is made by means of the screen printing (resolution of drawback <2>), and no degradation of the specular gloss appearance is found when printing has been made on the backside of a transparent polycarbonate substrate and viewing is made from the front surface side thereof (resolution of drawback <3>). Accordingly, the present invention can provide an ink that can concurrently resolve the above described drawback <1>, drawback <2>, and drawback <3>, a production method of the ink, the materials for producing the ink, and the printed matter wherein printing is made by use of the ink.

What is claimed is:

1. An ink consisting essentially of:
    100 parts by weight of an aluminum flake containing aluminum flakes of 0.5 mm or less in thickness and 20 $mm^2$ to 2,000 $mm^2$ in flake area, in an amount of 75 wt % or more;
    3 to 200 parts by weight of a binding agent; and
    600 to 4,000 parts by weight of a solvent containing 20 wt % or more of 3-methyl-3-methoxy-1-butanol.

2. The ink according to claim 1, wherein the thickness of said aluminum flake is 0.3 mm or less.

3. A production method of the ink according to claim 1, comprising a step of mixing a mixture consisting essentially of an aluminum flake containing aluminum flakes of 0.5 mm or less in thickness and 20 $mm^2$ to 2,000 $mm^2$ in flake area in an amount of 75 wt % or more and a solvent containing 3-methyl-3-methoxy-1-butanol in an amount of 20 wt % or more, with either a binding agent or a binding agent solution.

4. A production method of the ink according to claim 2, comprising a step of mixing a mixture consisting essentially of an aluminum flake containing aluminum flakes of 0.3 mm or less in thickness and 20 $mm^2$ to 2,000 $mm^2$ in flake area in an amount of 75 wt % or more and a solvent containing 3-methyl-3-methoxy-1-butanol in an amount of 20 wt % or more, with either a binding agent or a binding agent solution.

5. A mixture consisting essentially of an aluminum flake containing aluminum flakes of 0.5 mm or less in thickness and 20 $mm^2$ to 2,000 $mm^2$ in flake area in an amount of 75 wt % or more and a solvent containing 3-methyl-3-methoxy-1-butanol in an amount of 20 wt % or more.

6. A mixture consisting essentially of an aluminum flake containing aluminum flakes of 0.3 mm or less in thickness and 20 $mm^2$ to 2,000 $mm^2$ in flake area in an amount of 75wt % or more and a solvent containing 3-methyl-3-methoxy-1-butanol in an amount of 20 wt % or more.

7. Printed matter comprising ink according to claim 1 printed on a transparent substrate.

8. Printed matter comprising ink according to claim 2 printed on a transparent substrate.

9. The printed matter according to claim 7, wherein said transparent substrate comprises polycarbonate resin.

10. The printed matter according to claim 8, wherein said transparent substrate comprises polycarbonate resin.

11. The printed matter according to claim 7, wherein viewing is made from the surface, as being the front surface, opposite to the printed surface of said transparent substrate.

12. The printed matter according to claim 8, wherein viewing is made from the surface, as being the front surface, opposite to the printed surface of said transparent substrate.

13. The printed matter according to claim 9, wherein viewing is made from the surface, as being the front surface, opposite to the printed surface of said transparent substrate.

14. The printed matter according to claim 10, wherein viewing is made from the surface, as being the front surface, opposite to the printed surface of said transparent substrate.

* * * * *

UNITED STATES PATENT AND TRADEMARK OFFICE
CERTIFICATE OF CORRECTION

PATENT NO. : 6,939,400 B2
APPLICATION NO. : 10/723265
DATED : September 6, 2005
INVENTOR(S) : Yuuji Suzuki It is certified that error appears in the above-identified patent and that said Letters Patent is hereby corrected as shown below:

Column 7: Line 19, delete "0.5 mm" and substitute --0.5 μm--; lines 19-20, delete "20 mm$^2$ to 2,000 mm$^2$" and substitute --20 μm$^2$ to 2000 μm$^2$--; line 26, delete "0.3 mm" and substitute --0.3 μm--; line 29, delete "0.5 mm" and substitute --0.5 μm--; line 30, delete "20 mm$^2$ to 2,000 mm$^2$" and substitute --20 μm$^2$ to 2,000 μm$^2$--; and line 36, delete "0.3 mm" and substitute --0.3 μm--.

Column 8: Line 1, delete "20 mm$^2$ to 2,000 mm$^2$" and substitute --20 μm$^2$ to 2,000 μm$^2$--; line 6, delete "0.5 mm" and substitute --0.5 μm--; line 7, delete "20 mm$^2$ to 2,000 mm$^2$" and substitute --20 μm$^2$ to 2,000 μm$^2$--; line 11, delete "0.3 mm" and substitute --0.3 μm--; and line 12, delete "20mm$^2$ to 2,000 mm$^2$" and substitute --20 μm$^2$ to 2,000 μm$^2$--.

Signed and Sealed this

Eighth Day of July, 2008

JON W. DUDAS
*Director of the United States Patent and Trademark Office*